United States Patent [19]

Gilmour

[11] 4,076,126
[45] Feb. 28, 1978

[54] MULTIPURPOSE DISPLAY RACK

[76] Inventor: Richard C. Gilmour, 207 Weymouth Ave., Scullville, N.J. 08330

[21] Appl. No.: 722,049

[22] Filed: Sep. 10, 1976

[51] Int. Cl.² .................. B42F 13/12; A47F 7/024
[52] U.S. Cl. .................................... 211/59.1; 211/4;
    211/125; 248/219.4; 248/231; 248/DIG. 9;
    403/234
[58] Field of Search ............ 211/125, 54, 57, 59,
    211/4, 7, 107–112, 182, 60, 86, 96, 100, 101,
    168–171, 196, 205; 248/74 R, 74 B, 74 PB, 168,
    218.4, 219.1, 219.4, 225.3, 231; 52/38, 40;
    403/234, 237, 190–192

[56] References Cited

U.S. PATENT DOCUMENTS

| 1,737,151 | 11/1929 | Derbyshire | 248/231 |
| 1,856,239 | 5/1932 | Buckley | 211/4 |
| 1,974,080 | 9/1934 | Marker et al. | 52/38 X |
| 3,104,122 | 9/1963 | Daniels | 248/219.4 |
| 3,136,519 | 6/1964 | Spriggle | 248/231 |
| 3,612,460 | 10/1971 | Smith | 248/231 X |
| 3,868,080 | 2/1975 | Olson | 248/218.4 X |

FOREIGN PATENT DOCUMENTS

| 1,343,400 | 10/1963 | France | 248/231 |
| 403,621 | 6/1909 | France | 248/231 |
| 485,827 | 10/1953 | Italy | 211/86 |
| 190,991 | 5/1937 | Switzerland | 211/110 |

Primary Examiner—Roy D. Frazier
Assistant Examiner—Terrell P. Lewis

[57] ABSTRACT

A display rack has a tubular extension arm with a plurality of hangers extending transversely from it. A holder and a support bracket are secured by a flexible bands to an upright pole member. One end of the extension arm is seated in the holder and a support chain is attached to the outer end of the arm. The other end of the support chain is connected to the support chain bracket. Closure bars fit over the respective hangers to secure goods suspended therefrom.

13 Claims, 8 Drawing Figures

U.S. Patent    Feb. 28, 1978    Sheet 1 of 3    4,076,126
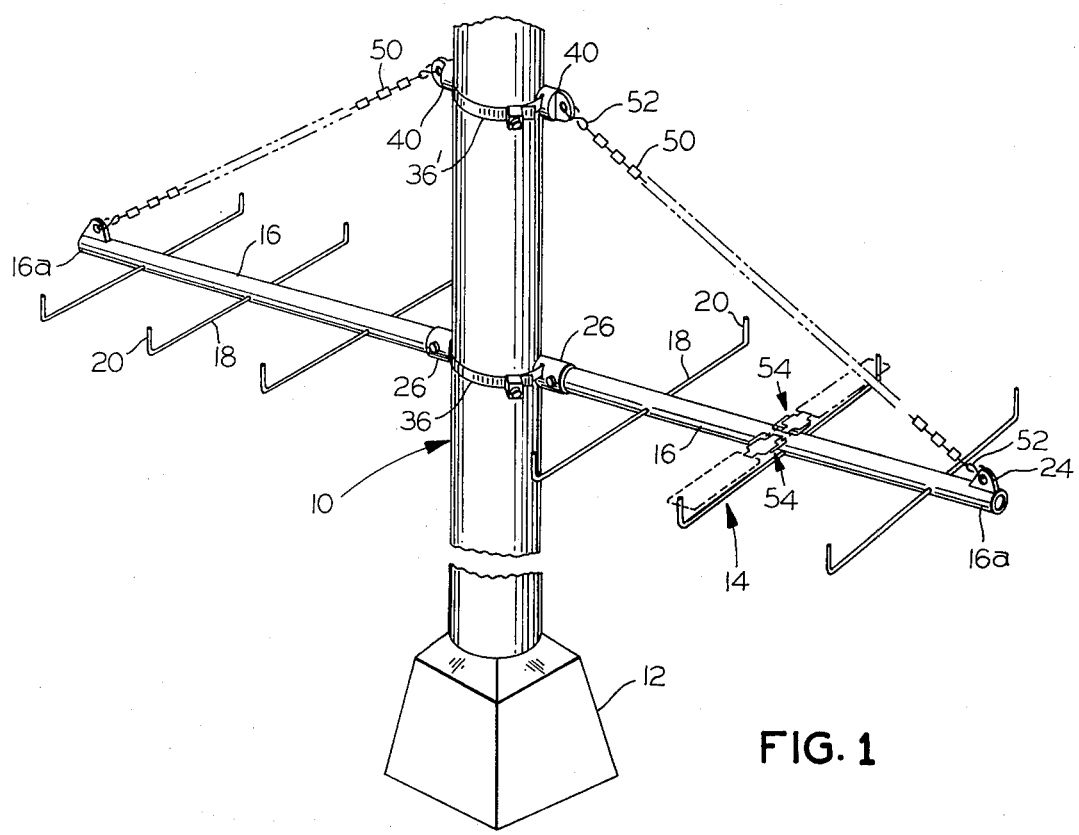
FIG. 1
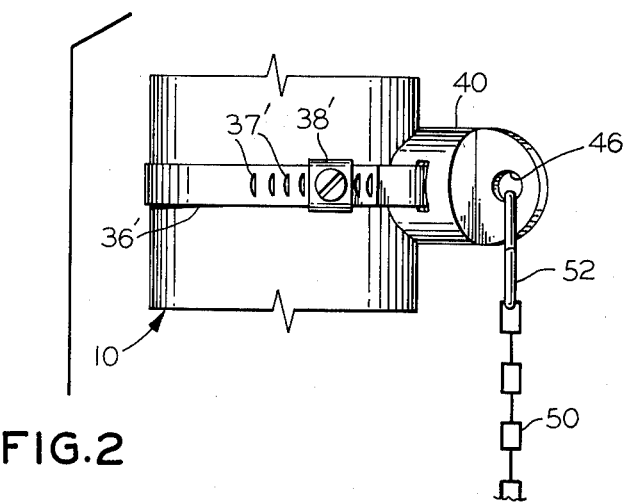
FIG. 2
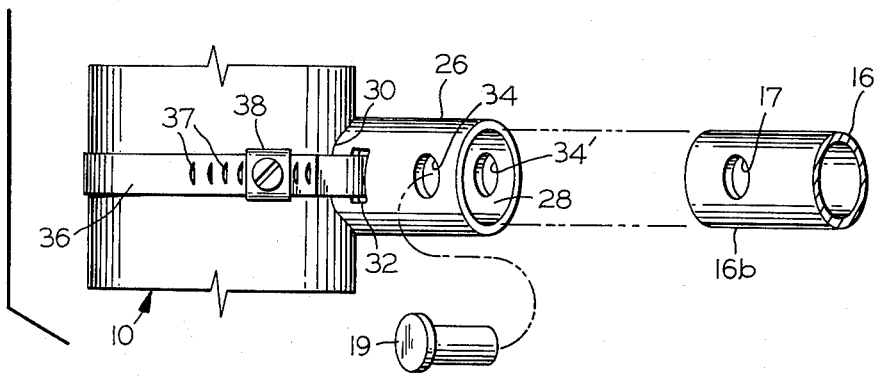

MULTIPURPOSE DISPLAY RACK

BACKGROUND OF THE INVENTION

The present invention concerns display racks of the type which are used to display numerous relatively small packages of merchandise.

Display racks of this general type are well known. For example, U.S. Pat. No. 1,742,164 shows a display rack in which a plurality of hangers are suspended from a vertical upright, each hanger being adapted to have suspended therefrom a plurality of small packages for display and vending purposes.

U.S. Pat. No. 2,155,097 shows a display fixture in which display support members are secured to an upright by screw clamp devices.

U.S. Pat. No. 2,764,830 shows a display sign construction in which flexible mounting bands are employed to secure the construction to a vertical upright pole.

Among the problems associated with such display racks, particularly when they are employed outdoors, is the difficulty of moving the racks and/or the merchandise for overnight storage. Another problem is the necessity, encountered with many of the prior art devices, for drilling into existing uprights such as light or sign poles or otherwise permanently securing brackets, support devices, etc. thereto to hold the display rack. Another problem is to secure the merchandise to the rack in order to prevent pilferage and yet enable easy removal of merchandise from the racks by the attendant or a customer.

It is accordingly an object of the present invention to overcome such problems and to provide a novel display rack of simple and inexpensive construction which may be readily mounted to and removed from existing uprights such as light poles and the like.

It is another object of the present invention to provide a novel multipurpose display rack which includes closure means which secure articles displayed on the rack against pilferage and which closure means are readily releasable by the attendant or customer to remove articles from the rack.

Other objects and advantages of the present invention will be apparent from the following description thereof.

SUMMARY OF THE INVENTION

A display rack for attachment to an upright pole member or the like includes an extension arm which has a socket end and an outer end. A suspension bracket is affixed to the extension arm at a location spaced from the socket end towards the outer end of the arm. A holder has a mounting seat at one end and a socket opening at the other end, the socket opening being adapted to receive the socket end of the extension arm. The holder further has at least one holder aperture which is located adjacent its one end. A first flexible mounting means is adapted to engage the holder through the holder aperture. A support bracket has a mounting seat at one end and at least one support bracket aperture located adjacent its one end. Second flexible mounting means are adapted to engage the support bracket through its support bracket aperture. A support link is adapted to be connected between the support bracket and the suspension bracket to support the extension arm. A plurality of hangers are attached to the extension arm and extend transversely from the arm and terminate in respective distal ends which are remote from the extension arm.

Certain objects of the invention are attained by including a plurality of closure means which have respective first ends attached to the extension arm and respective second ends which are removably connected to respective ones of the hangers adjacent to the distal ends thereof.

The closure means have respective base portions attached to the extention arm and extensible portions removably connected to the hangers. Latch means connect the respective base portions to their associated extensible portions and the latch means are operable between a first position in which the extensible portions are locked to their associated hangers and base portions, and a second position in which the extensible portion is unlocked from its associated hanger.

Other objects of the invention are attained by providing the display rack in combination with an upstanding pole member with the holder and the support bracket being secured to the pole member by, respectively, the first and second flexible mounting means, the support bracket being positioned vertically above the holder.

BRIEF DESCRIPTION OF THE DRAWINGS

FIG. 1 is a perspective view of one embodiment of the display rack of the invention attached to an upright pole member and with hangers for packages appended thereto; for clarity, only one of the closures 54 is shown in FIG.1;

FIG. 2 is an enlarged partial exploded view of the rack of FIG. 1;

DESCRIPTION OF THE PREFERRED EMBODIMENTS

Figure 4:
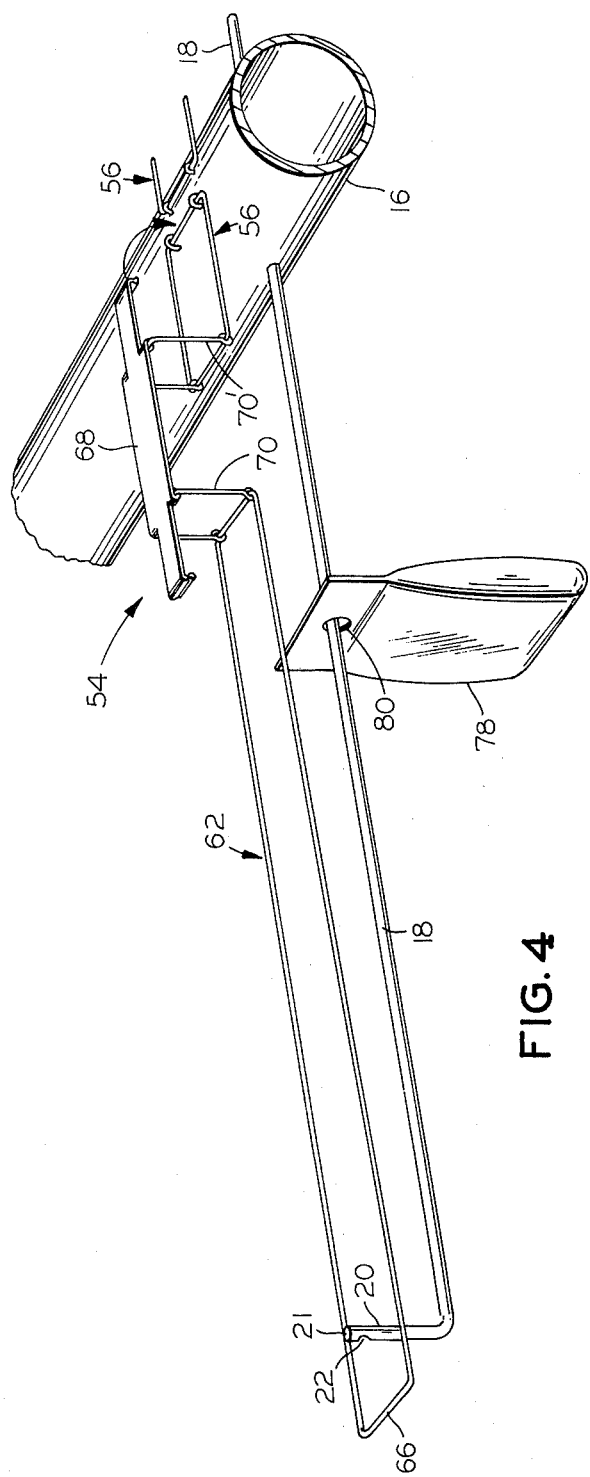
FIG. 4 is an enlarged perspective view of the rack of FIG. 1.

Referring to FIG. 1, an upright vertical pole member 10 is supported by a base 12. Pole member 10 is conveniently a preexisting structure such as a light pole or other member to which a display rack, generally indicated at 14, in accordance with the invention may be affixed. In FIG. 1 shows display rack 14 in its completed assembled state to pole member 10. Display rack 14 includes a pair of identical extension arms 16 which have a plurality of hangers 18 extending transversely from opposite sides of extension arm 16. As best seen in FIG. 4, extension arms 16 are of hollow tubular construction and hangers 18 are one piece items which extend through extension arms 16 and transversely from opposite sides thereof. Each of the hangers 18 terminates in a turned distal end 20. Near the tips 21 of distal ends 20 notches 22 are formed on the side of distal ends 20 remote from extension arm 16 (FIG. 4).

Extension arms 16 have affixed thereto, near the outer end 16a thereof, a suspension bracket 24. Suspension bracket 24 has an eye or hook or other suitable configuration to enable a support link or chain to be connected to it.

The other end of extension arm 16 comprises a socket end 16b as shown in FIG. 2. Socket end 16b may simply comprise a continuation of the tubular outer surface of extension arm 16 adapted to be received within holder 26 as described below.

Figure 3:
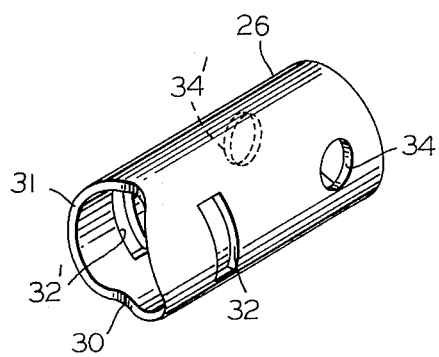
FIG. 3 is an enlarged perspective view of the holder of the rack of FIG. 1.

As seen in FIG. 1, a pair of identical holders 26 are employed in the embodiment illustrated. Referring to FIGS. 2 and 3, holder 26 is essentially a hollow tubular body having a socket opening 28 at one end and a mounting seat 30 at its opposite end. A pair of slot-shaped holder apertures 32, 32' are formed in holder 26 adjacent mounting seat 30 thereof. Holder apertures 32, 32' are disposed radially opposite each other to define a mounting passage through holder 26. Generally, the holder may comprise a hollow member of substantially uniform cross section as shown in the drawings.

A pair of apertures 34, 34' are also formed in holder 26 adjacent socket opening 28 thereof and apertures 34, 34' are similarly radially opposite each other to define a locking passage through holder 26.

In the embodiment shown, socket opening 28 is provided by one open end of holder 26 formed by a straight cut along a plane perpendicular to the longitudinal axis of the tube from which holder 26 is formed. However, mounting seat 30 is seen to be formed by a contoured cut of the opposite open end of holder 26 so that mounting edge 31 is somewhat saddle shaped. This saddle shape provides a firmer mounting of holder 26 to cylindrical pole members as may best be appreciated from FIG. 2. It is not essential that the contoured mounting edge 31 conform exactly to the diameter of the pole member 10 to which holder 26 is to be attached. The contoured mounting edge 31 will however provide better seating against a cylindrical pole than would a mounting edge 31 formed by a straight cut perpendicular to the longitudinal axis of the tube. When holder 26 is adapted and mounted against a flat surface, such as a pole 10 which is rectangular in cross section, then it is of course advantageous that mounting edge 31 be formed identically to socket opening 28. Generally, the mounting seat is formed by one end of the holder being cut to shape the one end for seating upon a surface of an upright pole member or the like.

Equally obviously, an adapter may be provided so that mounting seat 30 may be adapted to different shaped surfaces of poles 10.

Referring now to FIG. 2, socket end 16b of extension arm 16 is seen to have a radial passage 17 formed therein which extends entirely through socket end 16b. Upon insertion of socket end 16b into holder 26, as described in greater detail below, radial passage 17 is aligned with the locking passage defined by apertures 34, 34' and a cotter pin 19 is then inserted through aperture 34, radial passage 17 and aperture 34'. This locks extension arm 16 to holder 28 and supports it therein.

A first flexible mounting band 36 is passed through the mounting passage defined by holder apertures 32, 32' and around the circumference of pole member 10. A screw lock clip 38 of known type is used to fasten holders 26 by means of first flexible mounting band 36 in the known manner. Mounting band 36 has the known openings 37 formed therein to receive the screw portion of screw lock clip 38 in the known manner.

Figure 7:
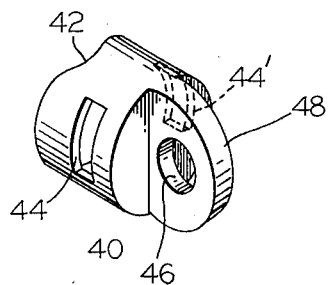
FIG. 7 is an enlarged perspective view of the support bracket of the rack of FIG. 1.

Referring to FIG. 7, support bracket 40 has a mounting seat 42 which may be contoured in a manner similar to that of mounting seat 30. While advantageous, contouring of mounting seats 30 and 42 is not essential. A pair of slot shaped support bracket apertures 44, 44' are formed in support bracket 40. An eye opening 46 is formed in a flat flange 48 which forms the outer end of support bracket 40.

As shown in FIGS. 1 and 2, support bracket 40 is mounted to upright member 10 by a second flexible mounting band 36' identical to that of the first flexible mounting band. Openings 37' are formed therein and an identical screw lock clip 38' is used to secure flexible band 37' in the known manner. Like holder 26, support bracket 40 is mounted to upright member 10 by passing the flexible mounting band through the support bracket mounting passage defined by apertures 44, 44'.

Support links comprising support chains 50 have hooks 52 attached at or near the opposite ends thereof in order to connect suspension brackets 24 of extension arms 16 to eye openings 46 of corresponding support brackets 40.

Figure 5:
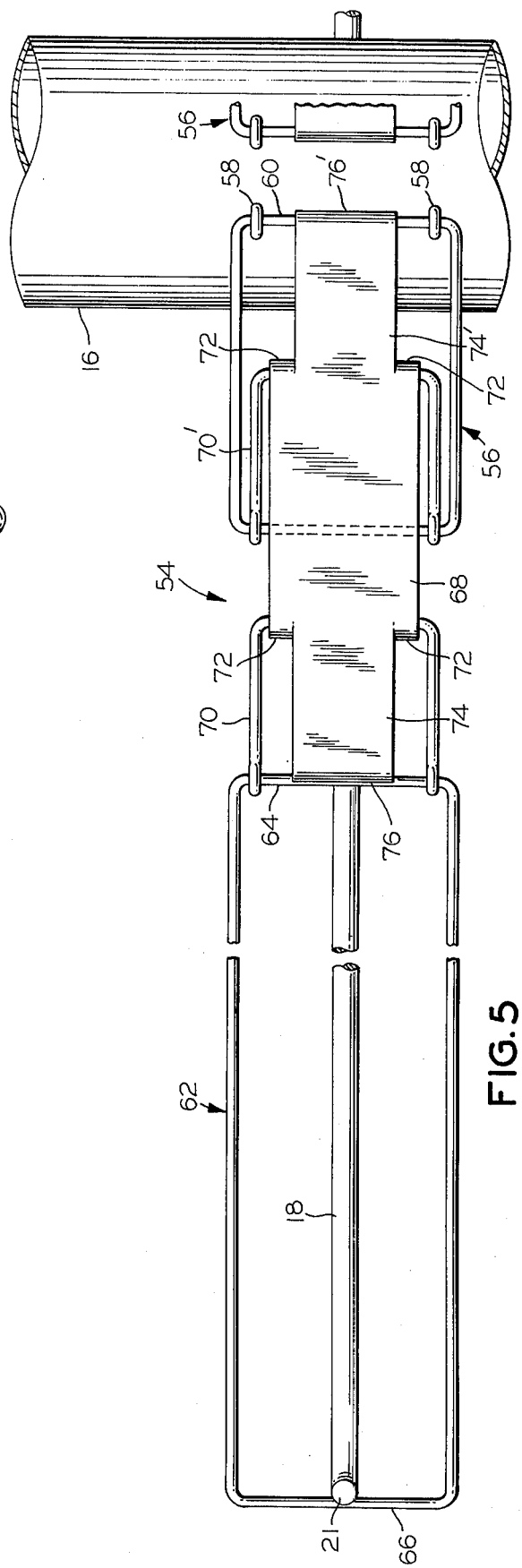
FIG. 5 is an enlarged partial top view of the rack of FIG. 1.

Referring to FIGS. 4 and 5 there are shown a closure means generally indicated at 54 and including a base portion 56 which comprises a generally rectangular loop of stiff heavy gauge wire. Base portion 56 is rotatably fastened to extension arm 16 by eyelets 58 affixed to the top of extension arm 16. One side of base portion 56 comprises a first latch bar 60.

A closure means 54 includes an extensible portion 62 which is also a generally rectangular loop made of a stiff heavy gauge wire, and is, in the embodiment shown, longer than base portion 56. Extensible portion 62 has one short side thereof which serves as a second latch bar 64 the opposite short side of extensible portion 62 serves as a hanger engaging bar 66.

A latch 68 has a pair of U-shaped connectors 70, 70' rotatably secured to latch 68 by being mounted in bushings 72 formed by a turned over edge portion of latch 68. Latch 68 has at opposite ends thereof neck portions 74, 74' which terminate in snap type latch lips 76, 76'.

With closure means 54 in the open, unlatched position shown in FIG. 4, a plurality of articles 78 (only one is shown) having suitable mounting holes 80 therein may be passed over the tips 21 and distal ends 20 of hangers 18 and arranged along the length of each of hangers 18. After the desired number of articles 78 are in place, closure means 54 is rotated downwardly so that hanger bar 66 is brought into engagement with notch 22 on distal ends 20 of the respective hanger 18. Latch 68 may then be rotated downwardly and towards the right in the direction indicated in the FIG. 4 by the curved arrow. U-shaped connectors 70, 70' are free to rotate within bushings 72 and about latch bar 64 (connector 70) and the unnumbered bar opposite latch bar 60 (connector 70'). Latch lips 76, 76' then engage, respectively, latch bars 64 and 60. In this manner closure means 54 is rigidly locked into position and articles 78 cannot be slipped off hanger 18 without releasing latch 68. When it is desired to remove articles 78, latch 68 may be opened by simply rotating it in the direction opposite that shown by the arrow shown in FIG. 4 which will release latch lips 76, 76' from associated latch bars. This frees extensible portion 62 which may be moved leftwardly (as viewed in FIG. 4) out of notch 22 and closure means 54 may be rotated upwardly towards the position indicated by dotted lines in FIG. 4 to permit removal of selected articles 78.

Figure 6:
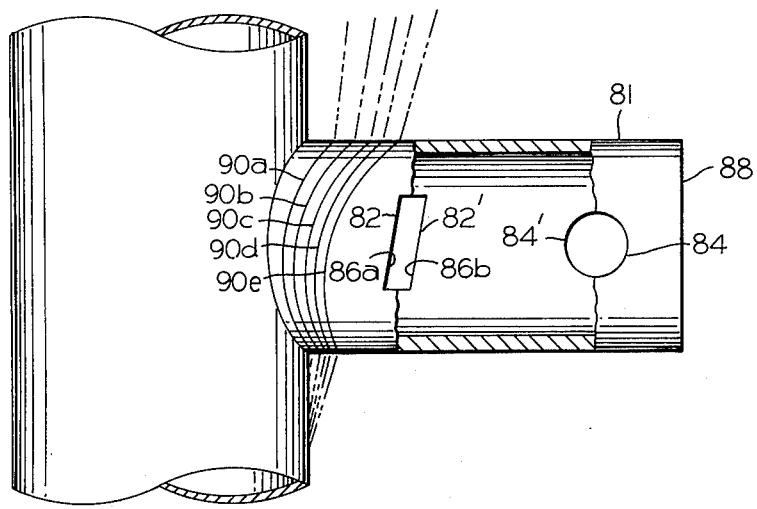
FIG. 6 is an enlarged partial view of another embodiment of the holder portion of the rack.

As indicated above, the mounting seat portion of holder 24 may be contoured to facilitate seating thereof on an upright pole member. FIG. 6 shows an embodiment of the invention adapted for selection and cutting by the user of a desired contoured mounting seat.

Holder 81 of FIG. 6 has mounting slots 82, 82', apertures 84, 84' and a socket opening 88 similar to that of the FIG. 3 embodiment. However, mounting slots 82 are disposed at a slant or angle relative to the longitudinal center line of holder 81. That is, the long or transverse sides 86a, 86b of mounting slots 82, 82' lie in a plane which is not perpendicular to the longitudinal axis of holder 81. The mounting seat end of holder 81 has a plurality of grooves 90a, 90b, 90c, 90d, and 90e formed therein. These grooves define different contours for the mounting seat of holder 81. Depending on the diameter or other dimensions or characteristics of the pole member on which holder 81 is to be mounted, the user may select the contour seat desired by cutting holder 81 along the desired one of grooves 90a through 90e.

Figure 8:
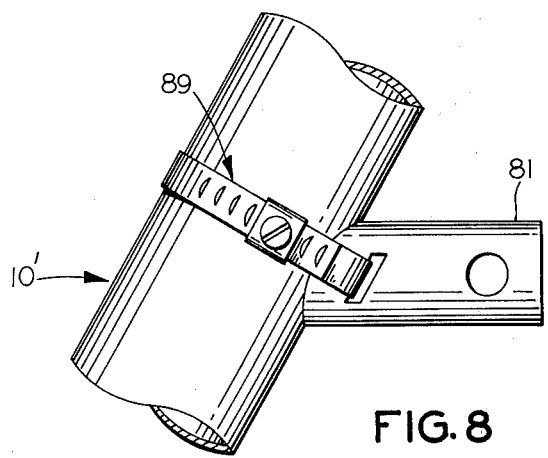
FIG. 8 is a partial perspective view showing the holder of FIG. 6 truncated and mounted to a non-vertical upright pole member.

For example, as shown in FIG. 8 holder 81 may be desired to be affixed to pole member 10' which is not a vertical upright but is an angled upright to the horizontal. In which case, one of the grooves 90a through 90e may be selected which provides a canted or angled contour seat so that holder 81, although affixed to a non-vertical upright 10', lies in a generally horizontal position after being mounted to upright 10' by flexible mounting means 89. The slanted configuration of slot shaped holder apertures 82 permits the band of flexible mounting means 89 to lie flat against non-vertical upright member 10' and generally perpendicular to the non-vertical longitudinal axis of member 10' and to lie flat against edges 86a of apertures 82, 82'. This promotes firm and secure mounting of holder 81 to non-vertical upright members. The mounting seat portion of the support bracket 40 may similarly be supplied with premachined grooves and slanted slot shaped support bracket apertures if desired.

Regardless of the specific embodiment of the holder and support bracket employed, the apparatus of the invention is quickly and easily assembled to any upright pole member by simply employing flexible mounting means to secure a desired number of holders 26 or 81 about an upright member 10. FIG. 1 shows two holders 26 secured by first flexible mounting means to a vertical upright member 10 but obviously any desired number of holders 26 may be employed. A corresponding number of support brackets 40 are then secured to upright member 10 at a position above which holders 26 are secured. Extension arms 16 are then introduced into the socket openings 28 of holders 26 and arranged so that radial passages 17 are aligned with apertures 34, 34'. Cotter pin 19 is then inserted through apertures 34, 17, and 34' to lock extension arms 16 to holders 26. One end of support chain 50 is then hooked, by means of hooks 52 which are preferably S-shaped hooks, to suspension bracket 24 of extension arm 16. The other end of chain 50 is hooked to eye opening 46 of support bracket 40. The procedure is repeated for each extension arm 16.

As may be the case with outdoor displays such as employed at automobile service stations and the like, it may be desired to remove the display rack for secure overnight storage at the close of business hours. This is accomplished quickly and simply by unhooking chain 50, removing cotter pin 19 and taking down extension arm 16. Holders 26 and support brackets 40 may be left in place on upright poles 10. In this manner, extension arms 16 with the merchandise thereon may simply be carried inside for storage and replaced at the opening of business hours the next day. Thus removing and handling of individual packages of merchandise 78 is avoided.

While the invention has been described with respect to the specific preferred embodiments thereof, numerous alterations and modifications to the specific embodiment structure may be made, which alterations and modifications are nonetheless within the spirit and scope of the invention.

Having thus described the invention, what I claim is:

1. A display rack for attachment to an upright pole member or the like comprising:
   A. an extension arm having a socket end and an outer end and a suspension bracket affixed thereto at a location spaced from said socket end towards said outer end:
   B. a holder comprising a hollow member of substantially uniform cross section having a mounting seat at one end and a socket opening at its other end, said mounting seat being comprised by said one end of said holder being cut to shape said one end of said holder for seating upon a surface of an upright pole member or the like; said socket opening receiving said socket end of said extension arm, said holder further having a holder aperture therein located adjacent said one end;
   C. first flexible mounting means engaging said holder through said holder aperture and adapted to mount said holder to the upright pole member or the like with said one end seated thereagainst;
   D. a support bracket having a mounting seat at one end and a support bracket aperture located adjacent said one end;
   E. second flexible mounting means engaging said support bracket through said support bracket aperture and adapted to mount said support bracket to the upright pole member or the like;
   F. a support link connecting said suspension bracket to said support bracket to support said extension arm therefrom; and
   G. a plurality of hangers attached to said extension arm and extending transversely therefrom and terminating in respective distal ends remote from said extension arm.

2. The display rack of claim 1 further including a plurality of closure means having respective first ends attached to said extension arm and second ends movably connected to respective ones of said hangers adjacent the distal ends thereof.

3. The display rack of claim 2 wherein said closure means each have respective base portions attached to said extension arm and extensible portions adapted to removably engage associated ones of said hangers, and latch means connecting said base portions to their associated portions, said latch means being operable between a first position wherein said extensible portions are engaged with their associated hangers and rigidly connected to their associated base portions by said latch means, and a second position wherein said extensible portions are freely rotatable with respect to their associated base portions and movable out of engagement with their associated hangers.

4. The display rack of claim 3 wherein said latch means is pivotably connected to said extensible portion and said base portion and links said extensible portion to said base portion, and said latch means has a pair of latch lips, one of which is removably engagable with said extensible portion and is engaged therewith in said first position, and the other of said lips is removably engagable with said base portion and is engaged therewith in said first position.

5. The display rack of claim 4 wherein said the distal ends of said hangers terminate in an end portion bent at an angle to the longitudinal axis of the associated hanger and a notch is formed in said end portion to receive said hanger engaging bar when said latch is in said first position.

6. The display rack of claim 2 wherein said holder is a hollow tube open at both ends thereof and said mounting seat of said holder has a saddle shaped contour adapted to seat said holder on a cylindrical pole surface.

7. The display rack of claim 2 wherein said holder is a hollow tube and further including a plurality of circumferential grooves formed at said one end of said holder adjacent said mounting seat, said grooves respectively dividing a variety of mounting seat configurations, a selected one of which is obtainable by truncating said holder along a selected one of said grooves.

8. The display rack of claim 2 wherein said mounting seat is contoured to an inclined position relative to the longitudinal axis of said holder, and said mounting apertures are slanted relative to the longitudinal axis of said holder to be mounted by said first flexible mounting means in a horizontal position on a non-vertical inclined pole member.

9. The display rack of claim 1 in combination with an upstanding pole member, said holder and said support bracket being secured to said pole member by, respectively, said first and second flexible mounting means with said support bracket vertically above said holder, said support link being connected at one end to said suspension bracket and at its other end to said support bracket.

10. The combination of claim 9 including a plurality of said holders secured to said pole member by said first flexible mounting means and a plurality of said support brackets secured to said pole member by said second flexible mounting means.

11. A display rack for attachment to an upright pole member or the like comprising:
A. an extension arm having a socket end and an outer end and a suspension bracket affixed thereto at a location spaced from said socket end towards said outer end;
B. a holder having a mounting seat at one end and a socket opening at its other end, said socket opening receiving said socket end of said extension arm, said holder further having a holder aperture therein located adjacent said one end;
C. first flexible mounting means engaging said holder through said holder aperture and adapted to mount said holder to an upright pole member or the like;
D. a support bracket having a mounting seat at one end and a support bracket aperture located adjacent said one end;
E. second flexible mounting means engaging said support bracket through said support bracket aperture and adapted to mount said support bracket to the upright pole member or the like;
F. a support link connecting said suspension bracket to said support bracket to support said extension arm therefrom;
G. a plurality of hangers attached to said extension arm and extending transversely therefrom and terminating in respective distal ends remote from said extension arm; and
H. a plurality of closure means having respective first ends attached to said extension arm and second ends movably connected to respective ones of said hangers adjacent the distal ends thereof, said closure means having respective base portions attached to said extension arm and extensible portions adapted to removably engage associated ones of said hangers, and latch means connecting said base portions to their associated extensible portions, said latch means being operable between a first position wherein said extensible portions are engaged with their associate hangers and rigidly connected to their associated base portions by said latch means, and a second position wherein said extensible portions are freely rotatable with respect to their associated base portions and movable out of engagement with their associated hangers, said latch means further being pivotably connected to said extensible portion and said base portion and linking said extensible portion to said base portion, and said latch means further having a pair of latch lips, one of which is removably engagable with said extensible portion and is engaged therewith in said first position, and the other of said lips is removably engagable with said base portion and is engaged therewith in said first position.

12. The display rack of claim 11 wherein said the distal ends of said hangers terminate in an end portion bent at an angle to the longitudinal axis of the associate hanger and a notch is formed in said end portion to receive said hanger engaging bar when said latch is in said first position.

13. A display rack for attachment to an upright pole member or the like comprising:
A. an extension arm having a socket end and an outer end and a suspension bracket affixed thereto at a location spaced from said socket end towards said outer end;
B. a holder having a mounting seat at one end and a socket opening at its other end, said socket opening receiving said socket end of said extension arm, said holder further having a holder aperture therein located adjacent said one end;
C. first flexible mounting means engaging said holder through said holder aperture and adapted to mount said holder to an upright pole member or the like;
D. a support bracket having a mounting seat at one end and a support bracket aperture located adjacent said one end, said mounting seat being contoured to an inclined position relative to the longitudinal axis of said holder, and said mounting apertures being slanted relative to the longitudinal axis of said holder to be mounted by said first flexible mounting means in a horizontal position on a non-vertical inclined pole member;
E. second flexible mounting means engaging said support bracket through said support bracket aperture and adapted to mount said support bracket to the upright pole member or the like;
F. a support link connecting said suspension bracket to said support bracket to support said extension arm therefrom; and
G. a plurality of hangers attached to said extension arm and extending transversely therefrom and terminating in respective distal ends remote from said extension arm.

* * * * *